United States Patent
Li et al.

(10) Patent No.: US 8,259,660 B2
(45) Date of Patent: Sep. 4, 2012

(54) METHOD AND NODE FOR PROVIDING A QUALITY OF SERVICE SUPPORT IN MULTIHOP COMMUNICATION SYSTEMS

(75) Inventors: Hui Li, Beijing (CN); Ping Li, Shanghai (CN); Hong Kui Shi, Nanjing (CN); Yi Sheng Xue, Beijing (CN); Dan Yu, Beijing (CN)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 459 days.

(21) Appl. No.: 12/227,485

(22) PCT Filed: May 18, 2007

(86) PCT No.: PCT/EP2007/054826
§ 371 (c)(1),
(2), (4) Date: Aug. 17, 2009

(87) PCT Pub. No.: WO2007/135093
PCT Pub. Date: Nov. 29, 2007

(65) Prior Publication Data
US 2009/0303925 A1 Dec. 10, 2009

(30) Foreign Application Priority Data
May 19, 2006 (EP) .................................. 06010409

(51) Int. Cl.
*H04W 4/00* (2009.01)
*H04L 12/28* (2006.01)
*H04L 12/56* (2006.01)
(52) U.S. Cl. .................. 370/329; 370/392; 370/395.43

(58) Field of Classification Search .................. 370/328, 370/329, 389, 392, 395.4, 395.42, 395.43
See application file for complete search history.

(56) References Cited

U.S. PATENT DOCUMENTS

| | | | |
|---|---|---|---|
| 6,721,270 B1 * | 4/2004 | Mitra et al. | 370/230 |
| 7,106,703 B1 * | 9/2006 | Belcea | 370/310 |

(Continued)

FOREIGN PATENT DOCUMENTS

| | | |
|---|---|---|
| RU | 2 273 098 C2 | 6/2005 |
| WO | 2004/051941 A1 | 6/2004 |

OTHER PUBLICATIONS

Mohammad Aminul Haq, et al., "Admission Control and Simple Class Based QoS Provisioning for Mobile Ad hoc Network", Vehicular Technology Conference, 2004, pp. 2712-2718.

*Primary Examiner* — Ronald Abelson
(74) *Attorney, Agent, or Firm* — Staas & Halsey LLP

(57) ABSTRACT

A method and apparatus according to the technique wherein support of a quality of service is provided for transmissions between at least one node (N) and at least one mobile station (MS1) in a multihop communication environment. Support is ensured by checking the quality of service class of each transmission prior to transmission. Once the checking has been performed, depending on the class of the checked transmission a multihop transmission or a direct transmission is selected for the transmission to the at least one mobile station, whereby a transmission having a quality of service class belonging to a first class of quality of service classes is transmitted using the direct transmission, whereas a transmission having a quality of service class belonging to a further class of quality of service classes is transmitted using the multihop transmission.

12 Claims, 2 Drawing Sheets

U.S. PATENT DOCUMENTS

| | | |
|---|---|---|
| 7,881,261 B2 * | 2/2011 | Julka et al. .................... 370/331 |
| 2003/0161284 A1 | 8/2003 | Chen |
| 2003/0202468 A1 | 10/2003 | Cain et al. |
| 2004/0205105 A1 * | 10/2004 | Larsson et al. ................ 709/200 |
| 2006/0209673 A1 * | 9/2006 | Ichihara et al. ............... 370/208 |
| 2006/0240826 A1 * | 10/2006 | Shinozaki ..................... 455/436 |

* cited by examiner

METHOD AND NODE FOR PROVIDING A QUALITY OF SERVICE SUPPORT IN MULTIHOP COMMUNICATION SYSTEMS

CROSS REFERENCE TO RELATED APPLICATIONS

This application is based on and hereby claims priority to International Application No. PCT/EP2007/054826 filed on May 18, 2007, and European Application No. 06010409, filed May 19, 2006, the contents of which are hereby incorporated by reference.

BACKGROUND

The embodiments discussed herein are is used in a communications system to ensure that transmissions which have a high quality of service requirement are efficiently transmitted from a node to a receiver.

SUMMARY

Communications systems today, comprise different networking and access technologies as well as providing a plurality of services to users.

In particular, in the case of mobile communications technologies such as UMTS (Universal Mobile Telecommunications System) and CDMA2000 (Code Division Multiple Access) are used. These technologies are grouped in the 3G (3rd Generation) mobile communication systems. One of the constraints of such systems is that the allocated frequency spectrum is limited. It has therefore been proposed that B3G (Beyond 3rd Generation) mobile communication systems be allocated to a higher frequency spectrum than the one used today.

A drawback of this, is that radio waves transmitted at these higher frequencies have a much lower penetration and refraction ability. Therefore, the range (or coverage) of the transmissions, transmitted by a node providing a MS (mobile station) access to backbone networks, for example to a PSTN (Public Switched Telephone Network) or the Internet, is shorter than the range currently possible for transmissions. As a consequence of this, transmissions will have to go over a number of hops (multihop) via a number of relay nodes (RNs), in order for the same area of coverage (cell area) to be maintained.

In such multihop environments, current access technologies like CDMA (Code Division Multiple Access), TDMA (Time Division Multiple Access), FDMA (Frequency Division Multiple Access), OFDMA (Orthogonal Frequency Division Multiple Access), SDMA (Space Division Multiple Access), CSMA (Carrier Sense Multiple Access), MF-TDMA (Multi-Frequency TDMA), W-CDMA (Wideband-CDMA) can be applied.

However, apart from the drawback that a large investment in infrastructure is required due to the fact that numerous RNs need to be integrated into current communication systems which in turn will increase the amount of network planning and management required, another important drawback, is that due to the nature of multihop environments, the QoS (Quality of Service) requirements for transmissions between a node and a MS, are more difficult to maintain than in current communication systems.

In multihop environments, as a transmission has to go through a number of hops before arriving at its destination, the time delay incurred is much larger than in communication systems wherein direct transmission is used. In cases that a transmission is time sensitive or has a high QoS requirement, such incurred delays are unacceptable.

Additionally, as the transmission involves several hops, it is prone to be affected by adverse factors such as interference, shadowing and other factors of radio transmission, as well as being open to interception on each hop for example by a Man in the Middle Attack: all of which, further reduce the ability to maintain a QoS requirement.

Proposed ways to overcome this issue and allow for QoS requirements to be met and to reduce the amount of delay incurred on transmissions, use overlay networks, which are logically created networks corresponding to the actual physical networks comprised in the communication systems, to allow different transmissions to be effected. However, the proposed solutions require a lot of processing power and co-operation between the different networks, as well as involving complex and time sensitive signalling and network management, in order to achieve their goal. Additionally, most of the management takes place centrally, requiring a high investment in equipment that can handle such operations as well as being a central point of failure, necessitating the further need of building into such networks redundancy, thus further increasing investment costs.

A need therefore exists, for a technique that can, in a simple and efficient manner, overcome the above mentioned drawbacks while at the same time improve the QoS support provided in communications systems comprising of multihop environments.

With the embodiments discussed herein, the above mentioned issues are resolved. The proposed technique allows for an improved QoS support to be implemented in a communications system in a simple and efficient manner. A plurality of QoS classes can be managed and maintained, without requiring complicated network management or an increase in the amount of signalling. It further removes the requirement of designing and using overlay networks in order to provide QoS support.

The technique provides for a quality of service support for a plurality of transmissions having a plurality of quality of service classes, between at least one node of a plurality of nodes and at least one mobile station of a plurality of mobile stations in a communications system having a multihop environment, including:

checking by the at least one node, of the quality of service class of each one of the plurality of transmissions, prior to transmitting the plurality of transmissions;

selecting by the at least one node, of a multihop transmission (mode) or a direct transmission (mode) for each one of the plurality of transmissions depending on the checked quality of service class, and transmitting by the at least one node to the at least one mobile station the plurality of transmissions, where at least one transmission of the plurality of transmissions has a quality of service class belonging to a first class of the plurality of quality of service classes being transmitted using the direct transmission, and at least one further transmission of the plurality of transmissions having a quality of service class belonging to at least one further class of the plurality of quality of service classes being transmitted using the multihop transmission.

The advantage of the above, is that by taking into account the checked quality of service class of each transmission in selecting the appropriate type of transmission (multihop or direct), support for different quality of service requirements is provided in a simple and efficient manner.

The technique is applicable to transmissions including at least one of the following data formats: a data packet, a data frame, as well as to transmissions comprising of a stream of data transmitted during a session. Therefore, providing quality of service support, irrespective of the type of data format used.

When the node wants to effect a direct transmission to a mobile station instead of a multihop one, at least one subcarrier of a plurality of subcarriers from the available bandwidth at the node is used for the direct transmission. This at least one subcarrier belongs to a number of reserved subcarriers of the plurality of subcarriers, the reserved subcarriers being used for transmitting transmissions belonging to a first class of the plurality of quality of service classes. Allowing for resources to be made available at all times for transmissions that are selected for a direct transmission and ensuring that the quality of service requirements of such a class are supported. Furthermore, as direct transmissions are transmitted at a high transmit power in order for the transmission to reach the mobile station in one hop, signal interference increases, as does the power drain on the limited power resources of the transmitting node used for transmissions. In order to reduce power drain and signal interference, a fraction of the available subcarriers is reserved for such transmissions.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
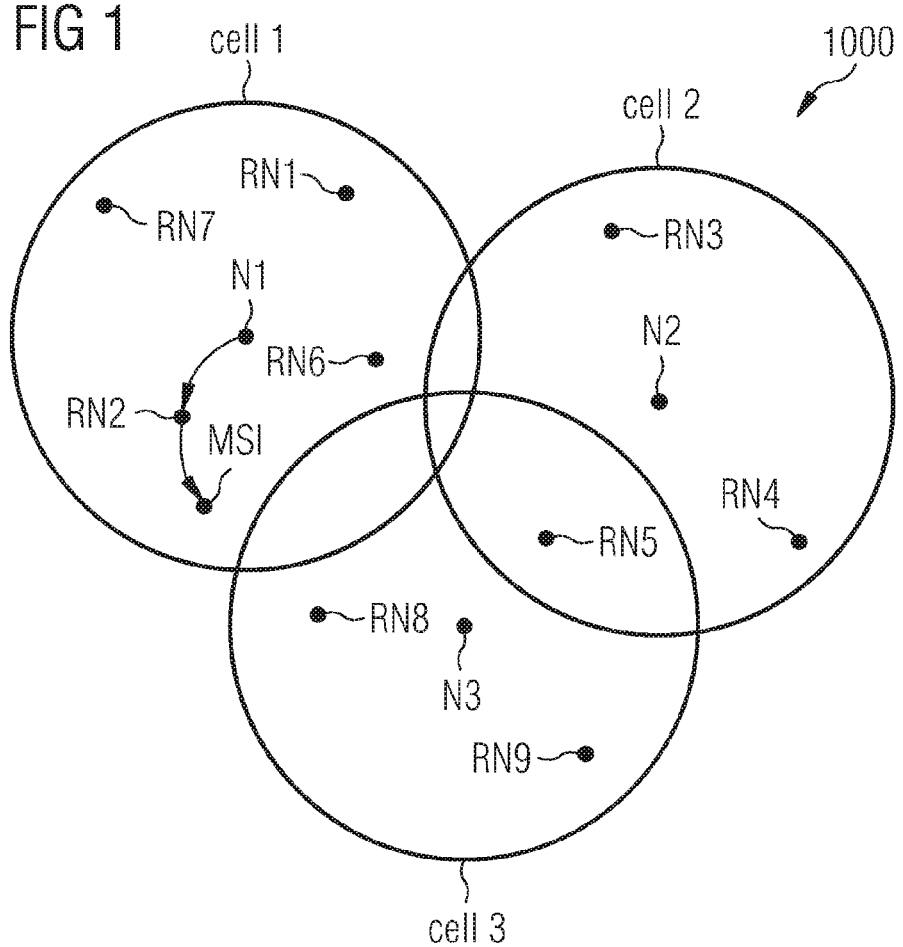
FIG. 1, depicts a communications system wherein the technique is applicable.

Reference will now be made in detail to the preferred embodiments, examples of which are illustrated in the accompanying drawings, wherein like reference numerals refer to like elements throughout.

In FIG. 1, a communications system 1000 is shown, wherein a multihop environment is present. Communications system 1000 is divided into cells, three of which are shown for purposes of illustration. Each cell in communications system 1000 is controlled by a node N. Nodes N1, N2 and N3 are shown and they respectively control cells 1, 2 and 3. Each node N, allows for a MS (mobile station) to be able to connect to the PSTN or the Internet or to another MS. For reasons of ease of understanding the mechanism by which each node N allows such connections to take place are not shown, however a person skilled in the art would be aware of the existence of other techniques, for example of MSCs (Mobile Switching Centres) that perform such a function. A node N in communications system 1000 is an access node, and can be one of the following: a BS (Base Station) or a BSS (Base Station Subsystem). Each cell also includes of a number of RNs (Relay Nodes), RN 1 to RN 9 which act as relays for transmissions of data packets, data frames, streaming data or a combination of them, between a MS and a node N. For example N1, communicates to MS1 via RN2, as a high frequency transmission does not have the range to reach MS1. The number of RNs in each cell depends on the manner in which the design of communications system 1000 has been implemented and can vary from cell to cell. In certain cases a BS, BSS or a MS can act as RNs. Furthermore, numerous access technologies like CDMA, TDMA, FDMA, OFDMA, SDMA, CSMA, MF-TDMA, W-CDMA are implemented in communications system 1000 singly or in combination.

Figure 2:
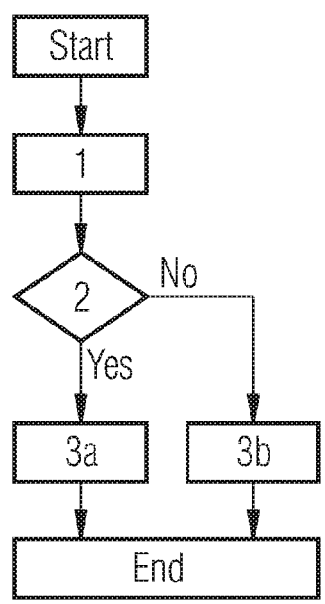
FIG. 2, depicts a flow chart showing the different steps performed by the technique.

In FIG. 2, a flow chart is depicted showing the different steps performed by the inventive technique in order to provide the QoS support to different transmissions.

In step 1, the QoS class of every transmission that is to be transmitted to a MS is checked (or verified) by node N, in order to see in which class of a plurality of quality of service classes the transmission belongs to.

In step 2, depending on the checked quality of service class, a multihop transmission or a direct transmission for each transmission to be effected is selected by node N. If the class of the checked quality of service class belongs to the first class, then a direct transmission is selected (Yes). If the class of the checked quality of service class belongs to another class then a multihop transmission is selected (No).

Depending on the result of step 2, node N transmits to mobile station MS, where a transmission having a quality of service class belonging to a first class of quality of service classes is transmitted using direct transmission, i.e. in a single hop (step 3a), and where a further transmission having a quality of service class belonging to a further class of quality of service classes is transmitted using a multihop transmission (step 3b).

In one illustrative embodiment, node N checks, the quality of service class of each transmission to be transmitted to an MS. In another embodiment only the first transmission to an MS is checked. As long as the quality of service class does not change further transmissions to the same MS are not checked. For example, if the transmission is streaming data, an initial quality of service class can be provided indicating the quality of service class for all the following transmissions relating to the streaming data to be transmitted to the MS. If at some point during the transmission the quality of service class requirement changes for some reason, then a new quality of service class requirement is transmitted so that node N is made aware of the new requirement. Transmission of the new requirement can be made for example by transmitting a message over a control channel indicating the change or by inserting the new requirement into the data stream with an indicator, such as a flag, indicating to the node that a new requirement is present.

The checking can be performed on every packet or frame that constitutes the transmission, or on the first packet or frame constituting the transmission, when the quality of service class is defined for the whole transmission but only included in the first packet or frame. Such a transmission can be a sequence indicators, enabling node N to recognise the series of packets or frames that constitute the transmission with the corresponding service class. It is also possible for example when streaming data is being transmitted over a session, for the quality of service to be provided to the node not in the first packet or frame but during the session set up. During transmission, the transmission can be a sequence indicators, enabling node N, which checks them, to recognise the data that constitute the stream with the corresponding service class provided during the session set up.

Once the checking has been executed, node N will select a type of transmission for each transmission depending on the checked quality of service class. The types can be either a multihop transmission or a direct transmission over one hop.

Once the selection of transmission type has been made, node N transmits the transmission to the MS.

The transmission is effected directly to the MS when the quality of service class of the transmission belongs to a first class of a plurality of classes. The first class comprises of QoS requirements for those transmissions defined by a user or the communications system 1000 as being important or high, for example time sensitive packet data or information contained in packet data that has a high security value. In a further embodiment, a user can define a number of classes that require a direct transmission. Within such a number of classes, a hierarchy is defined indicating the order in which such transmissions are effected.

The transmission is effected over a multihop transmission via RNs to the MS when the quality of service class of the transmission belongs to a further class of a plurality of classes.

The transmissions from node N are done using at least one subcarrier of the plurality of subcarriers available from the bandwidth assigned at node N. In particular the direct transmission is performed using at least one subcarrier belonging to a number of reserved subcarriers of the plurality of subcarriers used for transmitting transmissions belonging to a first class of quality of service classes. These subcarriers are reserved by the node N using a control mechanism, and they allocate a fraction of the subcarriers from the bandwidth available for those transmissions belonging to the first class of quality of service classes. The fraction reserved is small compared to the overall bandwidth available. This is due to the fact that node N has a limited transmit power capability and that direct transmissions in order to reach their destination in one hop require a high power transmission, which causes an increase in signal interference. Therefore, in order to reduce power drain on the limited power resources and signal interference, a small fraction of the available subcarriers is reserved for such transmissions. This fraction can be fixed by a network operator for communications system 1000 or alternatively it can be determined at each node N depending on statistics gathered by node N, for example on the number of transmissions made or on the type of data being transmitted etc.

When two nodes N1, N2 controlling two neighbouring cells 1, 2 allocate their corresponding fraction of subcarriers, the allocated subcarriers can be the same in the neighbouring cells or different. The subcarriers can be the same, provided that the interference generated is not too strong to affect the transmissions using the same subcarriers in neighbouring cells. The interference can be caused at nodes N1, N2 as well as at the different relay nodes that are used for the transmissions. In order to avoid such interference, central frequency planning is useful in communications system 1000, to co-ordinate the use of the subcarriers between neighbouring cells. If the interference generated is large enough to create problems, then timing co-ordination is useful between neighbouring cells, so that transmissions are not transmitted simultaneously. Furthermore, the allocated subcarriers can differ from cell to cell, allowing for a reduction of signal interference and an increase of the quality of the transmitted signals.

Figure 3:
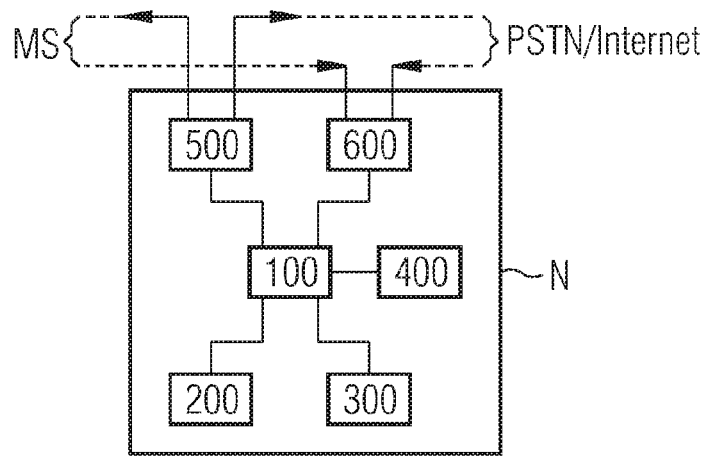
FIG. 3, depicts a block diagram showing the different means arranged in order to execute the inventive technique.

FIG. 3, is a block diagram showing the different means arranged in a node N, like N1, N2, and N3 implementing the technique. Node N includes a, control mechanism 100, a checking mechanism 200, and a selection mechanism 300. Control mechanism 100 is arranged to allocate the subcarriers from the available bandwidth to a first class of quality of service classes and further arranged to control node N. Checking mechanism 200 is arranged to check (or verify) the QoS class of every transmission, that is to be transmitted to a MS. The checking can be performed on every packet or frame that constitutes the transmission, or on the first packet or frame constituting the transmission, when the quality of service class is defined for the whole transmission but only included in the first packet or frame. Such a transmission includes sequence indicators, enabling node N to recognise the series of packets or frames that constitute the transmission with the corresponding service class. Selection mechanism 300 is arranged to select depending on the checked QoS a multihop or a direct transmission for each transmission to be effected.

Coupled to the control mechanism 100 is a transmitting mechanism 500 and a receiving mechanism 600 arranged to transmit and receive transmissions data packets or frames that originated in the PSTN and/or the Internet, or from an MS. Transmitting mechanism 500 further includes a power amplifier that provides the required power for the transmissions. In the case of transmissions originating from an MS, the receiving mechanism 600 is further arranged to use numerous access technologies, like CDMA, TDMA, FDMA, OFDMA, SDMA, CSMA, MF-TDMA, separately or in combination, which are used in communications system 1000.

As mentioned herein above, using high frequencies for transmissions of data packets to a MS has the disadvantage that the range of the transmissions is limited, and so RNs are required.

The use of relay nodes increases the overall time required for the transmission to reach an MS from a node N as it has to travel from node N to one or a number of relay nodes and from there to the MS. At each hop, signalling is required between node N and a relay node, between relay nodes if more are required to reach the MS and between the MS and a relay node in order to perform authentication, transmit, receive and acknowledge reception. The overall time thus increases.

Transmissions, whose QoS is defined as belonging to a first class, that is having a high QoS, include data or information relating to voice and/or multimedia services or simply transmissions wherein delay sensitive data or information is being transmitted or wherein a user transmitting data has assigned a high QoS requirement. Incurred delays due to a multihop environment as described hereinabove, is detrimental for transmissions with a high QoS.

The direct transmission is achieved by transmitting such a transmission at a high power, wherein the high power is high enough for the transmission to reach the MS without using any RN. The power, generated by the power amplifier in transmitting means 500 is dynamically modified by node N. Control 100, is further arranged to dynamically modify the transmission power used for each transmission, using power control 400. Parameters such as the amount of data being transmitted, the interference measured at node N, the distance of a MS from a node N etc., can also be used in order to modify the transmission power.

As disclosed hereinabove, data can be assigned to a quality of service class from a plurality of classes and the technique can, depending on the assigned quality of service, select between a multihop or a direct transmission. Additionally, the technique is applicable in an alternative embodiment, where instead of assigning a quality of service class to data, a quality of service class can be assigned to a particular service that is to be transmitted. Such a service can be for example a location based service (LBS) that needs to be transmitted over a cell broadcast. Different quality of service classes can be assigned to different services and, depending on the assigned quality of service, select the technique can select between a multihop or a direct transmission for the particular service.

Security is also increased as the number of hops is reduced to one, removing the possibility for an attacker to hijack the transmission at different locations along a multihop transmission.

Figure 4:
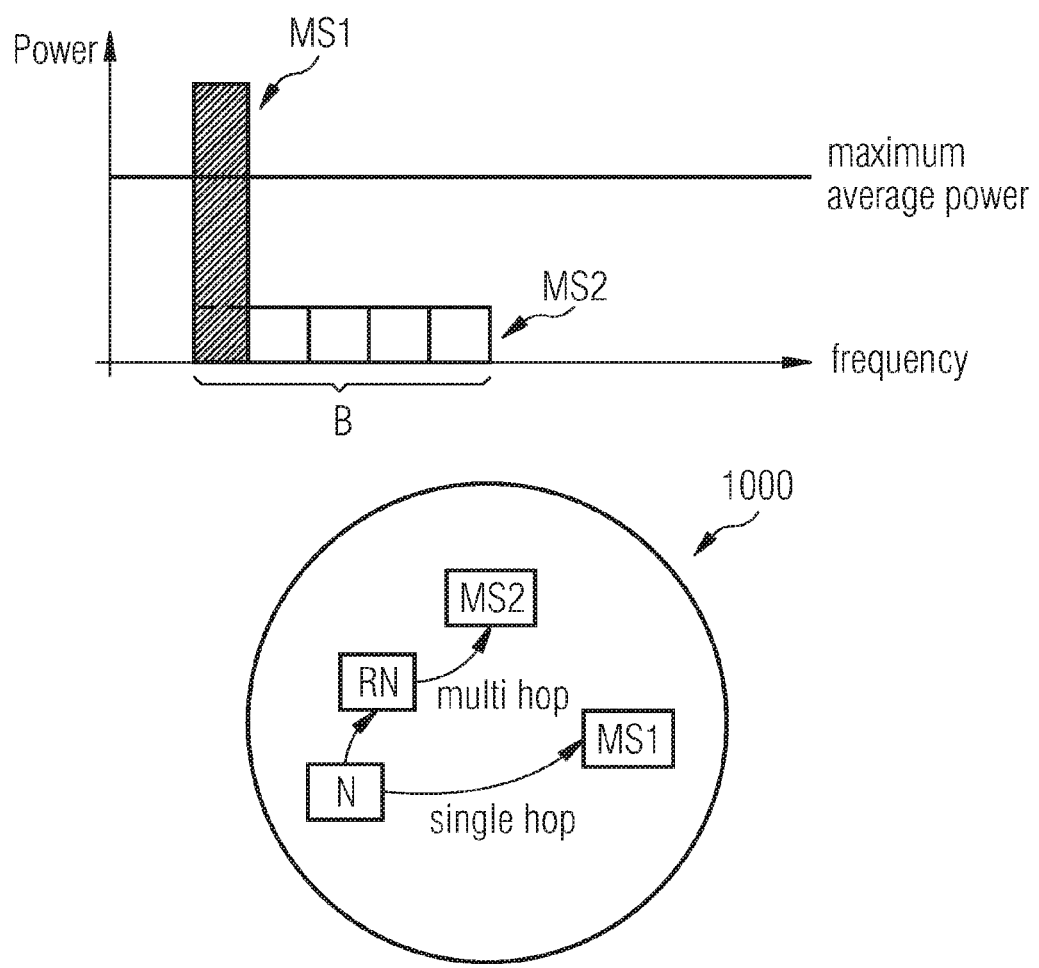
FIG. 4, depicts the power distribution for transmitting to mobile stations according to the technique.

FIG. 4 depicts the power distribution implemented by the technique. A node N of communications system 1000 has a certain available bandwidth B allocated to it. Node N allocates a small fraction of subcarriers from the bandwidth B for transmissions belonging to a first class of QoS. Each transmission destined for a MS is checked for the class of QoS to which it belongs to. A transmission to MS1 has a QoS belonging to a first class, while a transmission to MS2 belongs to a further class of QoS. As stated hereinabove, node N transmits to MS1 using the allocated subcarriers and at a high power transmission, which is above an average transmission power of node N, enabling the transmission to be effected in a single hop. Node N transmits using multihop to MS2 using some of the remaining subcarriers at a lower transmit power via the relay node RN.

As can be seen, when transmitting at a high power to MS1, support for the transmissions belonging to the first class is maximised as they are able to reach their destination in one hop. While transmissions to MS2 at a lower power level allow for the data throughput to be maximised for communications system 1000 without causing interference and consuming huge amounts of power, as such transmissions are spread over the remaining subcarriers of bandwidth B.

In another illustrative embodiment, instead of allocating subcarriers for transmissions belonging to a first class of a QoS, an MS can be defined as belonging to a first class of MSs whereby all transmissions must be transmitted directly to it. For example, in the case of an MS that is highly mobile. Thus, as the transmissions have a higher transmit power and a longer range such an MS is able to maintain connections with node N for longer periods of time. This removes the need to have to perform numerous intracell handovers from relay to relay node as the MS changes position. Less data packet or frames are dropped and less control signalling is generated within the system as well as improving the overall mobility support in communications system 1000.

The system also includes permanent or removable storage, such as magnetic and optical discs, RAM, ROM, etc. on which the process and data structures can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for providing a quality of service support for a plurality of transmissions having a plurality of quality of service classes, between at least one node of a plurality of nodes and at least one mobile station of a plurality of mobile stations in a communications system having a multihop environment, comprising:

checking by said at least one node, of the quality of service class of each one of said plurality of transmissions, prior to transmitting said plurality of transmissions;

selecting, by said at least one node, one of a multihop transmission and a direct transmission for each one of said plurality of transmissions depending on said checked quality of service class;

transmitting by said at least one node to said at least one mobile station said plurality of transmissions, wherein at least one transmission of said plurality of transmissions having a quality of service class belonging to a first class of said plurality of quality of service classes being transmitted using said direct transmission, and at least one further transmission of said plurality of transmissions having a quality of service class belonging to at least one further class of said plurality of quality of service classes being transmitted using said multihop transmission; and wherein the direct transmission is transmitted with higher power than the further transmission, wherein at least one subcarrier of a plurality of subcarriers being part of an available bandwidth at said node is used for said direct transmission, wherein a number of subcarriers involved for the direct transmission is smaller than the number of subcarriers used for said further transmission.

2. A method according to claim 1, wherein the plurality of transmissions comprise of at least one of the following: a data packet, a data frame, and a stream of data.

3. A method according to claim 1, wherein said at least one subcarrier used for said direct transmission belongs to a number of reserved subcarriers of said plurality of subcarriers, used for transmitting transmissions having said first class of said plurality of quality of service classes.

4. A method according to claim 3, wherein said number of reserved subcarriers is a fraction of said plurality of subcarriers being part of said available bandwidth.

5. A node arranged for providing a quality of service support for a plurality of transmissions having a plurality of quality of service classes, between said node and at least one mobile station of a plurality of mobile stations in a communications system having a multihop environment, comprising:

checking means for checking the quality of service class of each one of said plurality of transmissions, prior to transmitting said plurality of transmissions;

selecting means for selecting, depending on said checked quality of service class, one of a multihop transmission and a direct transmission for each one of said plurality of transmissions, and transmitting means for transmitting to said at least one mobile station said plurality of transmissions, wherein said transmitting means for transmitting at least one transmission of said plurality of transmissions having a quality of service class belonging to a first class of said plurality of quality of service classes using said direct transmission and for transmitting at least one further transmission of said plurality of transmissions having a quality of service class belonging to at least one further class of said plurality of quality of service classes using said multihop transmission; and wherein the direct transmission is transmitted with higher power than the further transmission, wherein at least one carrier of a plurality of subcarriers being part of an available bandwidth at said node is used for said direct transmission, wherein a number of subcarriers involved for the direct transmission is smaller than the number of subcarriers used for said further transmission.

6. A node according to claim 5, wherein said transmitting means uses said at least one subcarrier for said direct transmission for transmissions having said first class of said plurality of quality of service classes, said at least one subcarrier belonging to a number of reserved subcarriers of said plurality of subcarriers.

7. A node according to claim 6, wherein said transmitting means uses a fraction of said plurality of subcarriers being part of said available bandwidth for the number of reserved subcarriers.

8. A node according to claim 5, wherein said node is an access node.

9. A node according to claim 8, wherein said access node is one of the following: a base station, and a base station subsystem.

10. A communications system comprising at least one node according to claim 5 and at least one relay node.

11. A communications system according to claim 10, further arranged to use orthogonal frequency-division multiplexing as at least one access technology.

12. A method, comprising:
- selecting one of a multihop transmission mode and a direct transmission mode for a transmission responsive to a quality of service of the transmission; and
- transmitting the transmission using the selected mode, and
- wherein the direct transmission is transmitted with higher power than the multihop transmission,
- wherein at least one carrier of a plurality of subcarriers being part of an available bandwidth is used for said direct transmission,
- wherein a number of subcarriers involved for the direct transmission is smaller than the number of subcarriers used for a further transmission.

\* \* \* \* \*